Dec. 3, 1957  J. C. KAUFFMAN  2,815,128
TIRE GROOVING SUPPORT RACK
Filed Aug. 16, 1954   2 Sheets-Sheet 2
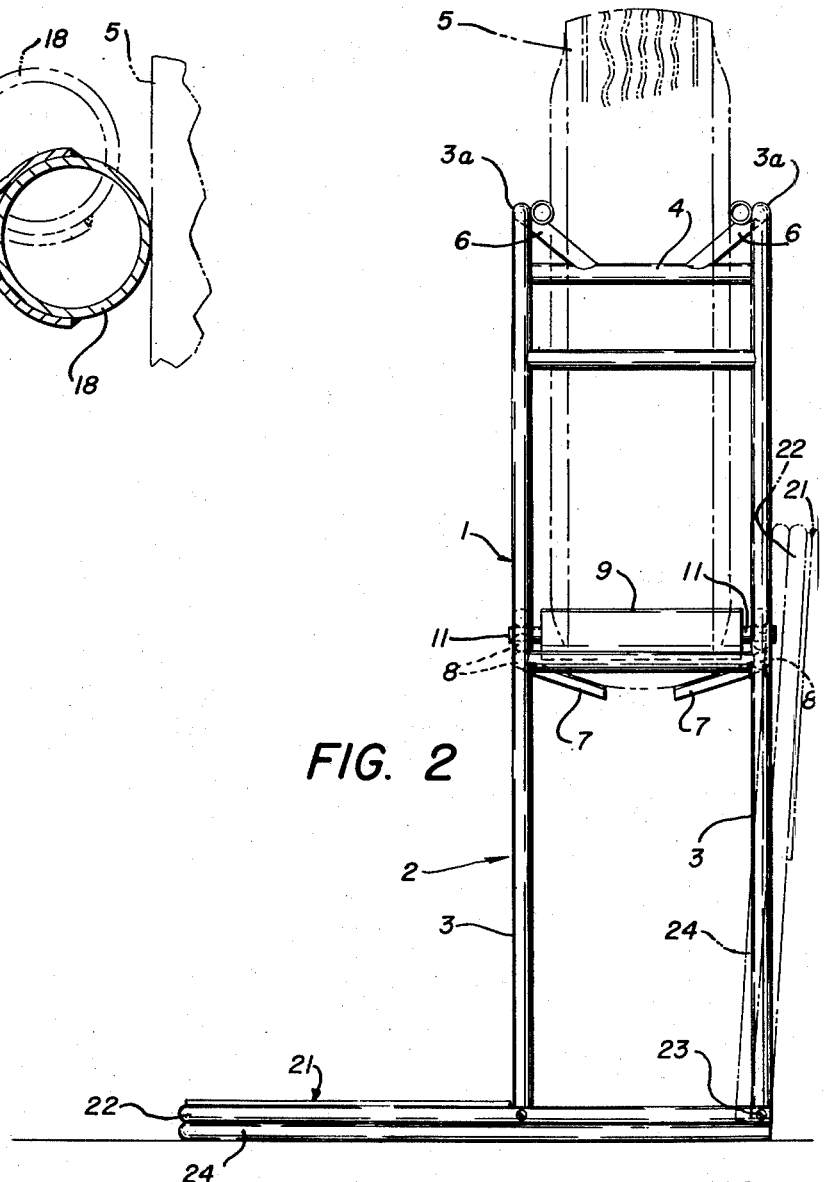
INVENTOR.
JACOB C. KAUFFMAN
BY
Oldham & Oldham
ATTORNEYS.

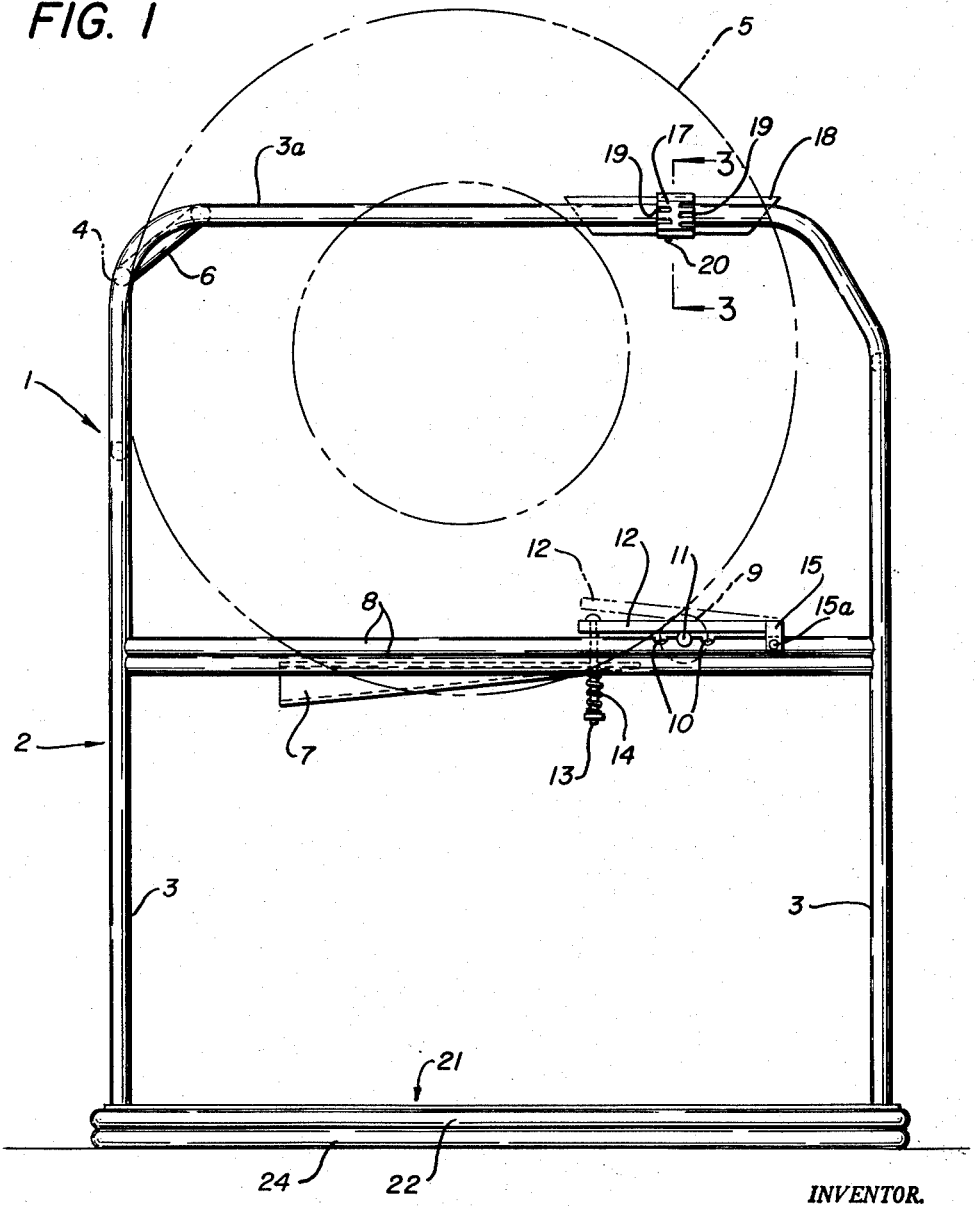

# United States Patent Office 2,815,128
Patented Dec. 3, 1957

2,815,128

TIRE GROOVING SUPPORT RACK

Jacob C. Kauffman, Cuyahoga Falls, Ohio

Application August 16, 1954, Serial No. 450,014

6 Claims. (Cl. 211—24)

This invention relates to tire regrooving apparatus and especially to a tire support rack used for positioning a tire for regrooving or grooving action.

Heretofore there has been relatively complicated, costly, heavy apparatus provided for regrooving tires when the original tread on the tire has worn away and it is desired to renew the tread surface by the addition of special grooves thereto for increasing the frictional action of the tire tread. Insofar as I am aware, no portable, lightweight, inexpensive type of apparatus has been provided for a tire regrooving operation, and particularly for aiding in such regrooving action by supporting a tire in a desirable manner so that the entire periphery of the tire can easily be exposed for cutting action thereon.

The general object of the present invention is to provide a lightweight, sturdy but inexpensive type of a tire support particularly suited for use in tire grooving or regrooving operations.

Another object of the invention is to provide an open centered pipe or rod type of a portable tire support or rack for receiving a tire therein and permitting the tire to be rotated 360 degrees on its own axis.

A further object of the invention is to provide a pair of adjustable clamps on a tire support rack for engaging various sizes of tires positioned in the rack to hold the tire securely in a given position.

Other objects of the invention are to provide a roll in a tire support rack onto which a tire can easily be pulled or lifted to facilitate rotating the tire about its periphery, to provide means for adjusting the position of the roll in the rack for a variety of tire sizes, and to provide clamp means in the rack that can be easily slid to and from a locked position engaging a tire because of the resiliency of a tire to be held in operative position on the rack by such clamp means.

The foregoing and other objects and advantages of the invention will be made more apparent as the specification proceeds.

One currently preferred embodiment of the invention is shown in the attached drawings, wherein:

Fig. 1 is a side elevation of a tire support rack of the invention with a tire being indicated engaged therewith;

Fig. 2 is a front elevation of the rack of Fig. 1; and

Fig. 3 is an enlarged vertical section taken on line 3—3 of Fig. 1.

In order to facilitate comparison between the drawings and specification, corresponding parts disclosed in the drawings and referred to in the specification are referred to by corresponding numerals to facilitate comparison between such parts.

Reference now should be had to the details of the structure shown in the drawings, and a tire support or rack, adapted for use in tire grooving work, is indicated as a whole by the numeral 1. This tire support or rack 1 is provided with an open center portion and is of a rod or tubular type of a construction. The tire support is primarily made from a frame 2 including a plurality of vertically extending members 3, connected by top bars or tubes 3a, while a transversely extending cross bar 4 is provided at a rear upper portion of the frame 2 for engaging the upper rear portion of a tire indicated at 5 carried by the tire support. This cross bar 4 preferably has upwardly and outwardly directed tubes or bars 6 connected thereto and extending to the top tubes 3a to aid in maintaining a tire on the tire support 1 positioned centrally of the tire support.

The tire 5 carried by the tire support 1 is primarily supported on means, such as a pair of support plates 7, that are secured to and extend from cross or reinforcing frame bars or tubes 8 positioned intermediate the top and bottom of the tire support frame 2 and reinforcing the members 3. These plates 7, as best shown in Fig. 1, preferably are inclined downwardly in a direction extending from front to rear of the frame 2 so that the tire 5 will be urged to bear upon the cross bar 4 and take a position adjacent the rear part of the frame. If desired, one unitary type of a support plate, such as one made from a wire grid, may be used in place of the plates 7.

After a tire 5 has been positioned in the open center portion of the frame 2, certain tire regrooving operations will normally be performed upon a portion of the tread area exposed on the tire 5 after which it is desirable to rotate the tire 5 about its own axis for regrooving action on another part of the tire periphery. Such action is facilitated by the provision of a roller 9 journalled on a lower but front portion of the frame 2 on the support bars 8, as indicated. Preferably a plurality of pairs of opposed but spaced recesses 10 would be provided in the upper portions of the support bars 8 for engaging the ends of a shaft 11 on which the roller 9 is positioned. A pair of clamp bars 12 are provided for releasable engagement with the ends of the shaft 11 on each side of the roller 9 and are resiliently urged against such shaft 11 by means of bolts 13 and springs 14. One of the bolts 13 is secured to one end of each of the clamp bars 12 and they extend through the support bars 8. The coil springs 14 are compressed between the lower portions of the bolts 13 and the lower surface of the support bars 8 so that the clamp bars 12 are urged downwardly of the frame 2 by bolts 13. The other ends of the clamp bars 12 are pivotally secured, as by brackets 15 and journal pins 15a, to a front portion of the support bars 8. The brackets 15 are welded or otherwise fixedly secured to the clamp bars 12. Hence, by manually lifting the free ends of the clamp bars 12 upwardly, the clamp bars can be released from engagement with the shaft 11 and the roller 9 can be adjusted longitudinally of the frame to a desired position for engaging the periphery of a tire positioned on the frame 2.

A tire should be fixedly positioned on the frame when performing a regrooving action thereon and to such end, it is desirable to have, usually, a pair of clamp means provided on opposed sides of the tire support 1 for engaging the tire. These clamp means are shown as comprising a positioning bracket 17 that is secured, as by welding, to a clamp sleeve 18, or similar member. The brackets 17 slidably engage the tubes 3a and are provided with a plurality of circumferentially spaced longitudinally directed slots 19 therein and such slots are adapted to engage with a locking pin 20 positioned on each of the upper tubes 3a of the frame 2. By rotating the brackets 17 with relation to the tubes 3a, it is possible to extend the clamp sleeve 18 a variable distance towards the open center portion of the tire support. Thus the clamp members can be brought into resilient engagement with opposed sides of the tire 5 even though a variety of sizes of tires may be positioned in the support. When the clamp sleeves 18 are brought into resilient engagement with the tire 5, then the sleeve and clamp unit can be slid longitudinally so as to engage the pin 20 with the desired slot 19 so that the clamp sleeve will be resiliently held in engagement with the sides of the tire. It will be realized that the tire is sufficiently compressible, that the clamps can be readily slid the short distance required in the support 1 to lock the clamp means in a desired position, and that a small amount of manual pressure applied to the tire sidewall adjacent the clamp will permit the ready release of the clamp when the tire is to be moved or pulled from the tire support frame. Figs. 1 and 3 of the drawings best show that the brackets 17 have alternate slots 19 at opposite ends thereof. The brackets and clamp sleeves may be turned so that the pins 20 are released from the brackets 17 by positioning the brackets 17 so that the pins 20 extend into the triangular shaped space between the sleeve 19, bracket 17 and clamp sleeve 18. The brackets 17 then would be slid longitudinally on the tubes 3a to bring the opposite edge of the bracket adjacent the pin for engaging a slot with the pin to position the clamp sleeve.

It will be seen that the tire support 1 is relatively lightweight and small in size so that it can readily be moved from place to place as desired for tire regrooving or similar operations.

The tire support 1 is made into a sturdy but movable unit adapted for convenient use by either a right-handed person or a left-handed person by means of a support stand 21 secured to the frame 2 by means of a U-shape arm 22 that extends from the stand 21 for being bolted or otherwise removably and pivotally engaged with the frame 2 by bolts 23, for example. In Fig. 2, the stand 21 is shown on the left hand side of the frame 2 so that a right handed person could stand thereon and readily work with his right arm on the tire 5 whereas the stand easily could be made to extend to the right side of the frame for use by a left handed person, as desired. A stiffener tube 24 is suitably secured to the lower surface of the arm 22. The support unit can be swung around to lie against the opposite side of the stand 21, as indicated in Fig. 2 by removing the screws or bolts securing the vertically extending members 3 to the stand 21.

It should be noted that the roll or roller 9 is positioned at the front lower portion of the tire 5 but above the support plates 7. Normally the roller aids in urging the tire 5 towards the back portion of the support 1. However, by pulling the tire 5 forwardly, it easily and readily rolls up on the roller 9 to permit the operator to easily move the tire 5 about its own axis and expose a different part of the tire periphery for grooving action.

It has been found that a tire support 1 provides a convenient easy engagement with a tire for tire regrooving action and that the apparatus and support rack function readily as clearly set forth herein. Hence it is contended that the objects of the invention have been achieved.

While one complete embodiment of the invention has been disclosed herein, it will be appreciated that modification of this particular embodiment of the invention may be resorted to without departing from the scope of the invention as defined in the appended claims.

What is claimed is:

1. A tire support comprising an open centered frame for receiving a tire, a base support member on said frame to support a tire therein, a roll journalled on said frame at a front portion thereof adjacent said support member to enable a tire to be engaged with said roll to facilitate rolling the tire about its periphery in said frame, positioning means for said roll to journal it at any of a plurality of positions on said frame to engage various sized tires, clamp means adjustably carried on said frame for engaging the upper front portions of a tire thereon to secure the tire against movement, and means on said frame to engage back upper parts of a tire to aid in holding the tire in a given position.

2. A tire support comprising an open centered frame for receiving a tire, a support member on said frame to support a tire therein, a roll journalled on said frame adjacent said support member to enable a tire to be engaged with said roll to facilitate rolling the tire about its periphery in said frame, clamp means adjustably carried on said frame for engaging a tire thereon to secure the tire against movement, said clamp means including a carrier bracket with a plurality of slots therein at an end thereof and a clamp sleeve, said carrier bracket slidably engaging part of said frame to position said clamp sleeve a variable distance towards the open center of said frame, and pin means on said frame to engage a slot in said carrier bracket for holding said clamp sleeve in place against a tire to hold it in a given position.

3. A support for use in regrooving a tire and comprising an open rod type frame means to receive and position a tire, clamp means longitudinally slidably carried on said frame means and movable varied arcuate amounts into the center portion of said frame means to engage opposed side portions of a tire in said frame means and retain the tire in fixed position with its periphery exposed for regrooving action, means engageable with said clamp means by longitudinal movement thereof to hold said clamp means against rotation, and a roll journalled on said frame means to engage a tire thereon and facilitate revolving the tire in the support.

4. A support for use in regrooving a tire and comprising frame means to receive and position a tire, clamp means slidably and rotatably carried on said frame means to engage opposed side portions of a tire in said frame means, and means for engaging said clamp means and preventing the rotary movement of said clamp means towards a tire received in said frame means to vary the action of said clamp means for varied widths of tires.

5. A tire support comprising an open centered frame for receiving a tire, a support member on said frame to support a tire therein, a roll journalled on said frame adjacent said support member to enable a tire to be engaged with said roll to facilitate rolling the tire about its periphery in said frame, clamp means adjustably carried on said frame for engaging a tire thereon to secure the tire against movement, said clamp means including a carrier bracket with a slot therein at an end thereof and a clamp member, said frame and said clamp member being movable a variable distance towards the open center of said frame, and pin means on said frame to engage said slot in said carrier bracket for holding said clamp member in place against a tire.

6. A tire support comprising an open centered frame for receiving a tire, a support member on said frame to support a tire therein, a roll journalled on said frame adjacent said support member to enable a tire to be engaged with said roll to facilitate rolling the tire about its periphery in said frame, clamp means adjustably carried on said frame for engaging a tire thereon to secure the tire against movement, said clamp means including a carrier member with a slot therein at an end thereof and a clamp member, said carrier member rotatably and slidably engaging part of said frame to position said clamp member a variable distance towards the open center of said frame, and pin means on said frame to engage said slot in said carrier bracket by longitudinal movement of said carrier member on said frame for holding said clamp member in place against rotation on said frame.

References Cited in the file of this patent

UNITED STATES PATENTS

| | | |
|---|---|---|
| 813,588 | Rollins | Feb. 27, 1906 |
| 1,171,808 | Siberell | Feb. 15, 1916 |
| 2,323,846 | Saltsman | July 6, 1943 |

FOREIGN PATENTS

| | | |
|---|---|---|
| 440,915 | Germany | Feb. 18, 1927 |
| 743,142 | France | Jan. 6, 1933 |
| 957,212 | France | Aug. 22, 1949 |